(12) United States Patent
Kiwaki

(10) Patent No.: US 8,627,863 B2
(45) Date of Patent: Jan. 14, 2014

(54) TIRE HAVING AIR CHAMBERS IN RIB-SHAPED LAND PORTION

(75) Inventor: Yukihiro Kiwaki, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 6 days.

(21) Appl. No.: 13/321,773

(22) PCT Filed: Dec. 11, 2009

(86) PCT No.: PCT/JP2009/006794
§ 371 (c)(1),
(2), (4) Date: Feb. 7, 2012

(87) PCT Pub. No.: WO2010/134146
PCT Pub. Date: Nov. 25, 2010

(65) Prior Publication Data
US 2012/0132336 A1 May 31, 2012

(30) Foreign Application Priority Data

May 22, 2009 (JP) .................................. 2009-124612
Nov. 30, 2009 (JP) .................................. 2009-271999

(51) Int. Cl.
*B60C 11/04* (2006.01)
*B60C 11/12* (2006.01)
(52) U.S. Cl.
USPC ............ 152/209.15; 152/209.17; 152/209.18; 152/209.22; 152/DIG. 3
(58) Field of Classification Search
USPC ............. 152/209.15, 209.17, 209.18, 209.22, 152/DIG. 3
See application file for complete search history.

(56) References Cited

U.S. PATENT DOCUMENTS

| 580,070 | A | * | 4/1897 | Welch | .................... | 152/209.15 |
| 2009/0165908 | A1 | * | 7/2009 | Takahashi et al. | ........ | 152/209.18 |

(Continued)

FOREIGN PATENT DOCUMENTS

| EP | 989000 A2 * | 5/2000 |
| JP | 03-246104 A * | 11/1991 |

(Continued)

OTHER PUBLICATIONS

Machine translation for Japan 2008-201373 (no date).*

(Continued)

*Primary Examiner* — Steven D Maki
(74) *Attorney, Agent, or Firm* — Sughrue Mion, PLLC

(57) ABSTRACT

A pneumatic tire (10) provided in a rib-like land section (110) thereof with: an air chamber (130A) in which recessed portions (131) are repeated in the circumferential direction of the tire at predetermined pitches; and constriction groove (121) which communicate with the recessed portions (131). A height (H) changes in the circumferential direction of the tire. A bottom surface (132) has substantially the same height as the ground contact surface at a position which is the highest point of the bottom surface (132) which is maximally raised toward the ground contact surface. The volume of the space formed between each constriction groove section (121) and the road surface is less than the volume of the space formed between each recessed portion (131) and the road surface. One end (121a) of each constriction groove section (121) communicates with the corresponding recessed portion (131), and the other end (121b) of the constriction groove section (121) communicates with a circumferential groove (11). The configuration causes the depth of the air chamber section (130A) from the ground contact surface to change in the circumferential direction of the tire, and as a result, even if a stone or the like is caught by the air chamber section (130A), the stone or the like tends to easily come out of the air chamber section (130A) by being moved in the circumferential direction of the tire as the pneumatic tire (10) rolls.

11 Claims, 15 Drawing Sheets

(56) References Cited

U.S. PATENT DOCUMENTS

| | | | | |
|---|---|---|---|---|
| 2009/0272474 A1* | 11/2009 | Nagai et al. | | 152/209.18 |
| 2010/0175799 A1* | 7/2010 | Takahashi et al. | | 152/209.3 |
| 2012/0118460 A1* | 5/2012 | Kiwaki et al. | | 152/209.18 |
| 2012/0125500 A1* | 5/2012 | Kiwaki | | 152/209.18 |
| 2012/0132336 A1* | 5/2012 | Kiwaki | | 152/209.18 |

FOREIGN PATENT DOCUMENTS

| | | | | |
|---|---|---|---|---|
| JP | 05-338414 A | * | 12/1993 | |
| JP | 06-239107 A | | 8/1994 | |
| JP | 06-239107 A | * | 8/1994 | |
| JP | 07-076203 A | | 3/1995 | |
| JP | 07-076203 A | * | 3/1995 | |
| JP | 2001-287510 A | | 10/2001 | |
| JP | 2002-036819 A | | 2/2002 | |
| JP | 2007-237816 A | | 9/2007 | |
| JP | 2008-155798 A | | 7/2008 | |
| JP | 2008-179289 A | | 8/2008 | |
| JP | 2008-201373 A | * | 9/2008 | |
| WO | WO 2007/114430 A1 | | 10/2007 | |
| WO | WO-2007/114430 A1 | * | 10/2007 | |

OTHER PUBLICATIONS

Machine translation for Japan 07-076203 (no date).*
Machine translation for Japan 06-239107 (no date).*
Machine translation for Japan 05-338414 (no date0.*
Machine translation for Europe 989,000 (no date).*
International Search Report of PCT/JP2009/006794, dated Mar. 16, 2010.
Japanese Office Action dated Jun. 26, 2012, issued in Patent Application No. 2010-207377.

* cited by examiner

FIG. 15
(a)
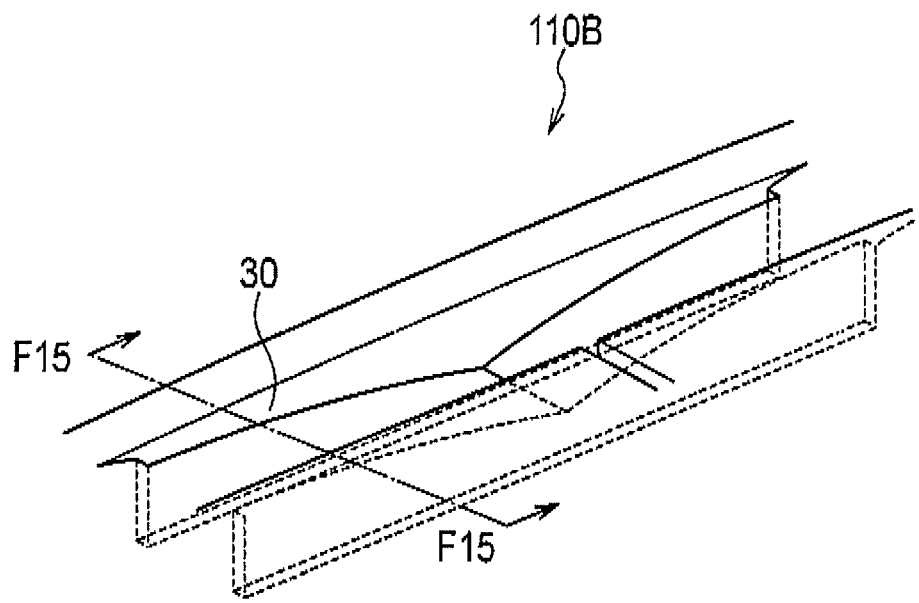
(b)
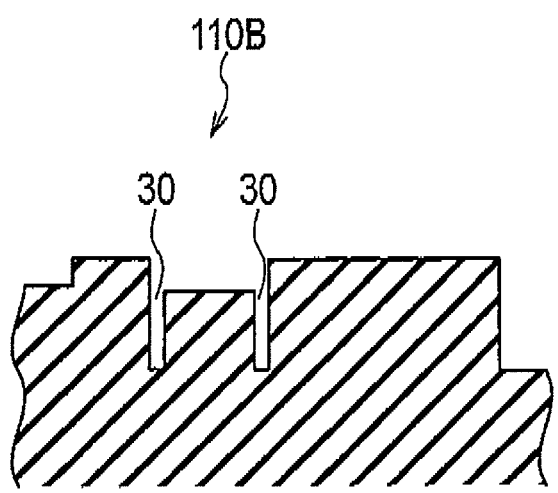

TIRE HAVING AIR CHAMBERS IN RIB-SHAPED LAND PORTION

TECHNICAL FIELD

The present invention relates to a tire equipped with a rib-shaped land portion adjacent to a circumferential groove which extends along a tire circumferential direction, in particular, relates to a tire equipped with a Helmholtz type resonator which has an air chamber and a constriction groove on the rib-shaped land portion.

BACKGROUND ART

In passenger vehicles of recent years, the demands for the reduction of tire noise have been increasing more and more compared to the past along with the improved reduction of vehicle noise (such as wind sounds and mechanical sounds) and further consideration of the environment.

From among the different types of tire noises, in order to reduce the air column resonance formed by the circumferential groove extending along the tire circumferential direction and the road surface, known are tires provided with a Helmholtz type resonator on the rib-shaped land portion extending along the tire circumferential direction. These resonators have an air chamber that forms a constant space by the tread making contact with the road surface and a constriction groove that communicates to the air chamber and the circumferential groove (for example, Patent Document 1).

PRIOR ART DOCUMENT

Patent Document

Patent Document 1: JP-A-2008479289 (pages 4 to 5, FIG. 3)

SUMMARY OF THE INVENTION

However, the following problems exists in the conventional tires described above. That is, there easily occurs a so-called "wedged stone", i.e., a small stone easily wedges itself in the Helmholtz type resonator provided on the rib-shaped land portion, especially, in the air chamber, thereby becoming a cause of increases of tire noises, After all, in spite of having a tread pattern that takes the reduction of the air column resonance into consideration, there is still a problem of not being able to effectively reduce the tire noise. Of course, if the size of the air chamber is increased, the wedged stone will be reduced although another problem occurs that does not allow the air column resonance to be effectively reduced.

Thereupon, an object of the present invention is to provide a tire that controls the wedging of small stones and effectively reduces the air column resonance when Helmholtz type resonator is provided which has an air chamber that forms a constant space by making contact with the road surface and a constriction groove communicated to the air chamber and the circumferential groove.

To solve the above problems, the present invention has following features. First, a first feature of the present invention is summarized as a tire (pneumatic tire 10) comprising a rib-shaped laud portion (rib-shaped land portion 110) extending along a tire circumferential direction (direction D1), which is adjacent to a circumferential groove (circumferential groove 11) extending along the tire circumferential direction, wherein an air chamber (chamber 130A, for example) in which a recessed portion (recessed portion 131) recessed toward an inside in the tire radial direction repeats at predetermined pitches (pitches P) along the tire circumferential direction and a constriction groove (constriction groove 121) communicating to the recessed portion are formed on the rib-shaped land portion, a height (height H) from a bottom surface (bottom surface 132) of the air chamber to a grounding surface at which the rib-shaped land portion makes contact with a road surface changes along the tire circumferential direction, a volume of a space formed by the constriction groove and the road surface is smaller than a volume of a space formed by the recessed portion and the road surface, and one end (end portion 121a) of the constriction groove communicates to a closed space formed by the air chamber and the road surface, and the other end (end portion 121b) of the constriction groove communicates to the circumferential groove.

A second feature of the present invention according to the first feature is summarized as that the bottom surface of the air chamber contacts the road surface at a highest position (highest position 132a) where a height to the grounding surface is highest.

A third feature of the present invention according to the second feature is summarized as that the bottom surface of the air chamber makes a line contact the road surface along a direction different from the tire circumferential direction.

A fourth feature of the present invention according to the first to third features is summarized as that one end of the constriction groove communicates to the recessed portion at a lowest position (lowest position 132b) where the position of the bottom surface is lowest.

A fifth feature of the present invention according to the first to fourth features is summarized as that the bottom surface of the air chamber repeats an arch shape forming a circular arc in a cross sectional view along the tire circumferential direction.

A sixth feature of the present invention according to the fifth feature is summarized as that the center of the circular arc is positioned at a further inner side of a tire radial direction than the bottom surface.

A seventh feature of the present invention according to the first to fourth features is summarized as that the bottom surface of the air chamber is in a sine wave shape in a cross sectional view along the tire circumferential direction.

An eighth feature of the present invention according to the first to seventh features is summarized as that the air chamber comprises: a first air chamber (chamber 130A); and a second air chamber (chamber 130B) arranged at a position different from a position at which the first air chamber is arranged in a tread width direction (direction D2), a shape of the bottom surface of the second air chamber is approximately the same as a shape of the bottom surface of the first air chamber, in the first air chamber and the second air chamber, the recessed portion repeats at the predetermined pitches, and the highest position of the bottom surface of the first air chamber and the highest position of the bottom surface of the second air chamber are shifted in phase by half the predetermined pitches, in the tire circumferential direction.

A ninth feature of the present invention according to the eighth feature is summarized as that the first air chamber and the second air chamber are arranged in the same rib-shaped land portion.

A tenth feature of the present invention according to the first to ninth features is summarized as that a chamfered portion (chamfered portion 150) is formed in a portion communicating to at least the constriction groove, of an edge portion along the tire circumferential direction of the rib-shaped land portion, and the chamfered portion is configured by a curved line, in a cross section along the tread width direction and the tire radial direction.

An eleventh feature of the present invention according to the first to tenth features is summarized as that the highest position at which the position of the bottom surface of the air chamber is highest is inclined in the tread width direction, viewed in a tread plane.

A twelfth feature of the present invention according to the first to eleventh features is summarized as that the lowest position at which the position of the bottom surface of the air chamber is lowest is inclined in the tread width direction, viewed in a tread plane.

A thirteenth feature of the present invention according to the first to twelfth features is summarized as that a circumferential direction sipe which extends along the tire circumferential direction and of which at least one end communicates to the recessed portion is provided between the rib-shaped land portion and the air chamber.

According to the characteristics of the present invention, it is possible to provide a tire that controls the wedging of small stones and effectively reduces the air column resonance when Helmholtz type resonator is provided which has an air chamber that forms a constant space by making contact with the road surface and a constriction groove communicated to the air chamber and the circumferential groove.

BRIEF DESCRIPTION OF THE DRAWINGS

FIG. 15 shows a part of a rib-shaped land portion 110E according to a sixth modification of the present invention.

DESCRIPTION OF EMBODIMENTS

Figure 1:
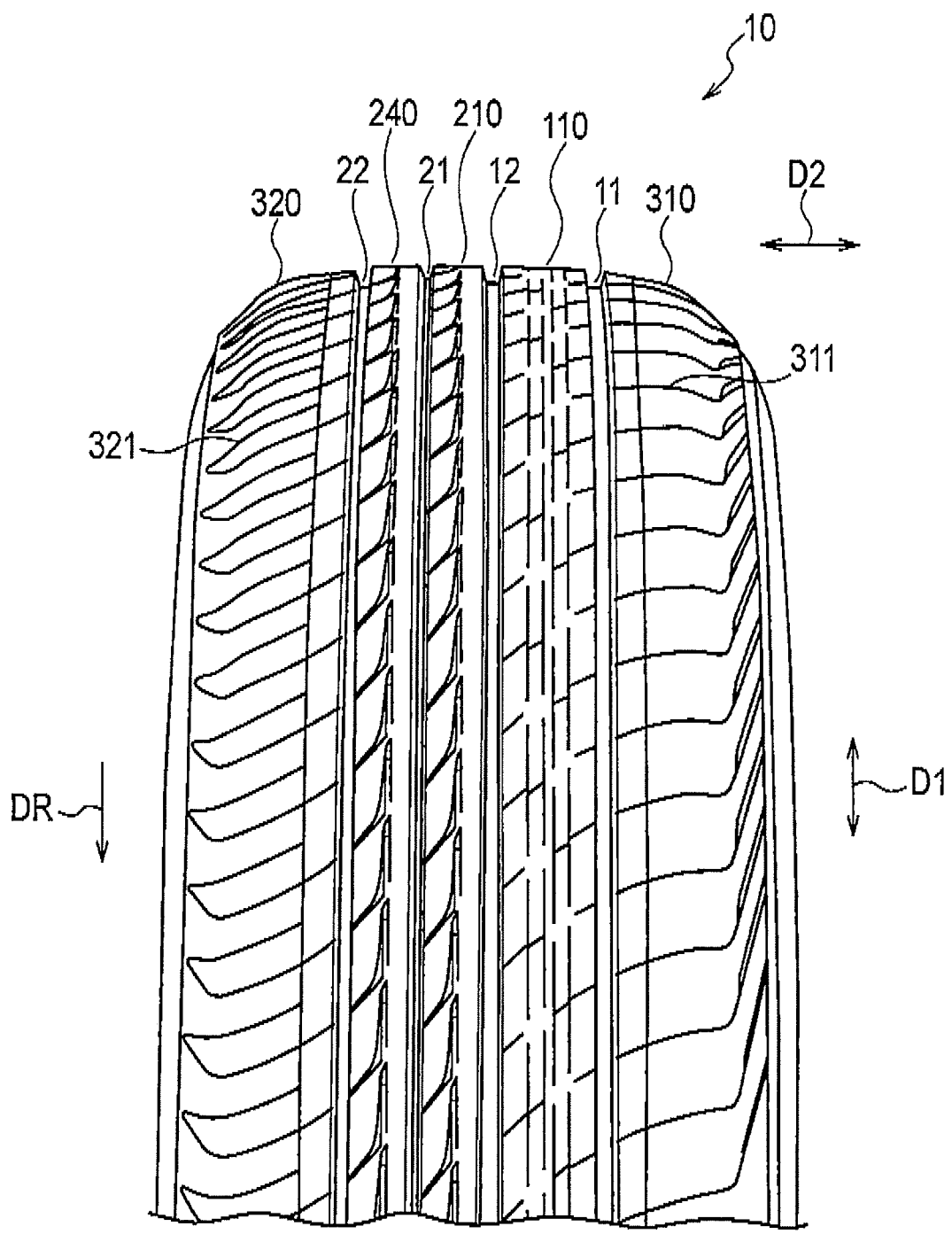
FIG. 1 is a partial front view of the pneumatic tire 10 according to a first embodiment.

Next, embodiments of the tire according to the present invention will be described referring to the drawings. Specifically, a first embodiment, a second embodiment, modifications, and other embodiments will be described.

In the following description of the drawings, the same or like constituent elements are designated by the same or like reference numerals. However, it should be kept in mind that the drawings are merely provided as schematic ones, and that each of the ratios of dimensions or the like is different from actual ones.

Therefore, specific dimensions or the like should be determined in consideration of the following description. In addition, it is a matter of course that, among the drawings as well, units of which interrelationships of dimensions or ratios are different from each other are included.

First Embodiment

In the following, a pneumatic tire 10 according to a first embodiment will be described. More specifically, (1) Overall schematic tire configuration, (2) Shape of rib-shaped land portion, and (3) Operation and Effect will be described.

(1) Overall Schematic Tire Configuration

FIG. 1 is a partial front view of the pneumatic tire 10. The rotational direction of the pneumatic tire 10 according to the first embodiment is direction DR of FIG. 1.

A plurality of circumferential grooves are provided on the pneumatic tire 10. In addition, the pneumatic tire 10 is provided with a plurality of rib-shaped land portions divided by the circumferential grooves and extending along the tire circumferential direction (direction D1 of FIG. 1). The pneumatic tire 10 is a tire manufactured taking into consideration of the reduction of tire noise such as air column resonance and is installed on passenger vehicles which require a high degree of quietness. Furthermore, the pneumatic tire 10 can be filled up with inert gas, such as nitrogen gas, instead of air.

More specifically, circumferential grooves 11, 12, 21, and 22 are formed on the pneumatic tire 10. The circumferential grooves 11, 12, 21, and 22 extend along the tire circumferential direction.

A rib-shaped land portion 110 is provided between the circumferential groove 11 and the circumferential groove 12. Namely, the rib-shaped land portion 110 is adjacent to the circumferential groove 11 and the circumferential groove 12 and extends along the tire circumferential direction.

A rib-shaped land portion 210 is provided between the circumferential groove 12 and the circumferential groove 21. The rib-shaped land portion 240 is provided between the circumferential groove 21 and the circumferential groove 22. The rib-shaped land portion 210 and the rib-shaped land portion 240 as well as the rib-shaped land portion 110 extend along the tire circumferential direction.

An air chamber 130A and an air chamber 130B (refer to FIG. 2) in which a recessed portion recessed toward the inside in the tire radial direction repeats along the tire circumferential direction at predetermined pitches are provided on the rib-shaped land portion 110.

A plurality of air chambers 220 (refer to FIG. 5) are provided on the rib-shaped land portion 210 along the tire circumferential direction. Similarly, a plurality of air chambers 250 (refer to FIG. 5) are provided on the rib-shaped land portion 240 along the tire circumferential direction.

Rib-shaped land portions 310 and 320 are provided on the outside in the tread width direction (direction D2 of FIG. 1) of the circumferential grooves 11 and 12. A plurality of inclined narrow grooves 311 are provided on the rib-shaped land portion 310, which are positioned at the further rear of the tire rotation direction (direction DR) from the outer end of the tread width direction than from the inner end of the tread width direction. A plurality of inclined narrow grooves 321 are provided on the rib-shaped land portion 320, which are positioned at the further front of the tire rotation direction (direction DR) from the outer end of the tread width direction than from the inner end of the tread width direction.

In other words, the pneumatic tire 10 according to the first embodiment has a right rising pattern (refer to FIG. 1). For this case, the balance of the pneumatic tire 10 is taken into consideration and a cord comprising a belt layer (not shown in the figure) is preferably slanted (namely, a left rising cord) toward the opposite side of the tread pattern as viewed in a tread plane.

(2) Shape of Rib-Shaped Land Portion

Next, the shape of a rib-shaped land portion will be described. Specifically, the shape of the rib-shaped land portion 110 and the rib-shaped land portions 210 and 240 will be described.

(2.1) Rib-Shaped Land Portion 110

Figure 2:
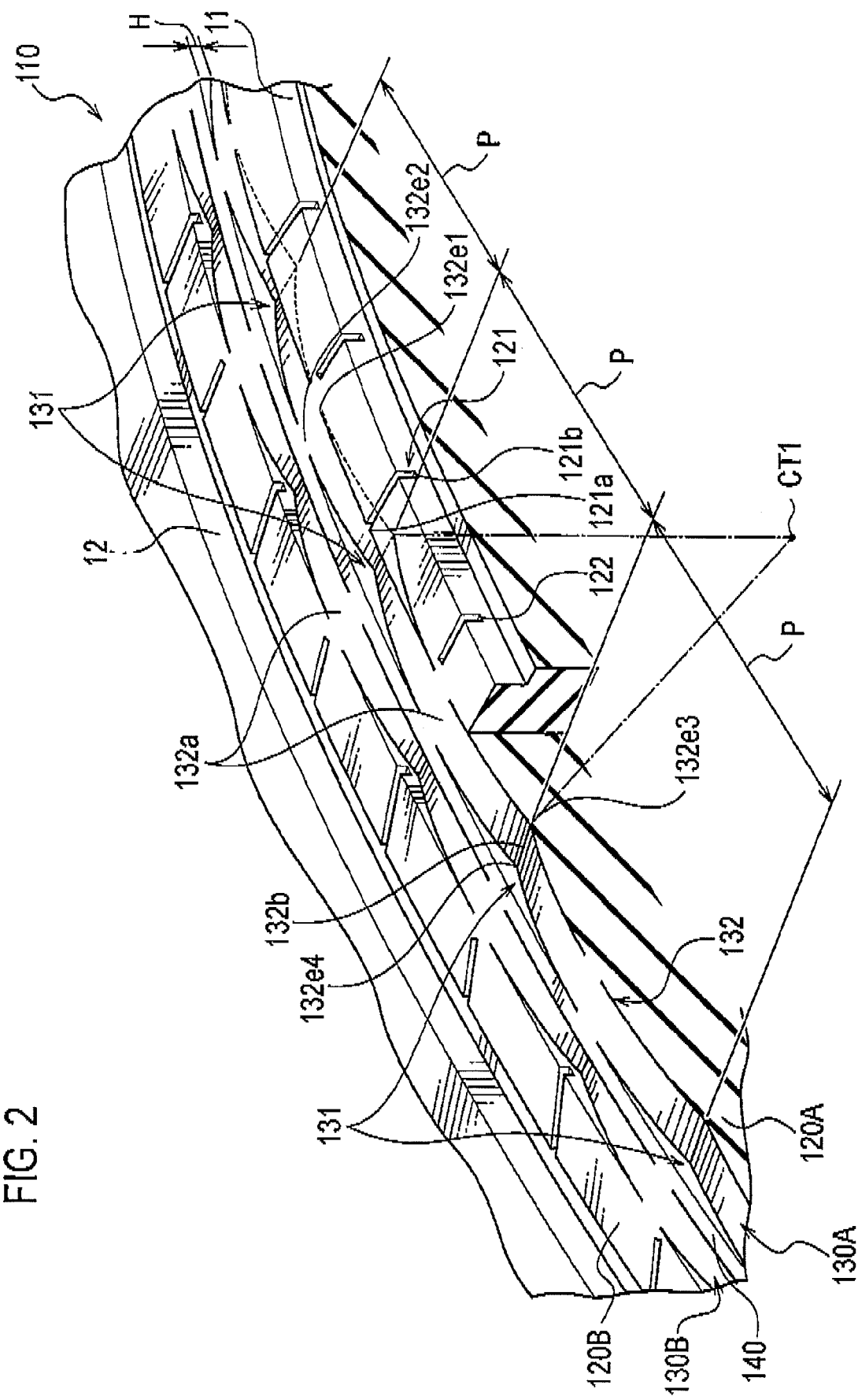
FIG. 2 is a partial perspective view of the rib-shaped land portion 110 with omitting the portion of the land portion 120A according to the first embodiment.

FIG. 2 is a partial perspective view of the rib-shaped land portion 110 with omitting the portion of the land portion 120A. As shown in FIG. 2, the rib-shaped land portion 110 has a land portion 120A, a land portion 120B, and a land portion 140. The land portion 120A, the land portion 120B, and the land portion 140 are grounded with road surface RS (not shown in FIG. 2, refer to FIG. 3) by means rolling motion of the pneumatic tire 10. In other words, the land portion 120A, the land portion 120B, and the land portion 140 configure the grounding surface of the pneumatic tire 10 grounded to the road surface RS.

The land portion 120A and the land portion 120B are provided at both ends in the tread width direction (direction D2) of the rib-shaped land portion 110. The land portion 120A is adjacent to the circumferential groove 11. The land portion 120B is adjacent to the circumferential groove 12.

The air chamber 130A and the air chamber 130B are provided on the rib-shaped land portion 110. The air chamber 130A is provided between the land portion 120A and the land portion 140. The recessed portion 131 is formed recessed toward the inside in the tire radial direction in the air chamber 130A.

As shown in FIG. 2, the recessed portion 131 is repeated at pitches of (predetermined pitch) along a tire circumferential direction.

Although the air chamber 130A and the air chamber 130B are provided on the same rib-shaped land portion (rib-shaped land portion 110), the air chamber 130B is provided at a different position from the air chamber 130A in the tread width direction (direction D2). More specifically, the air chamber 130B is provided between the land portion 120B and the land portion 140. The shape of the air chamber 130B is identical to that of the air chamber 130A. Namely, the recessed portion 131 is repeated at pitches of P for the air chamber 130A and the air chamber 130B. In a first embodiment, the air chamber 130A configures a first air chamber, and the air chamber 130B configures a second air chamber.

Since the shapes of the air chamber 130A and the air chamber 130B are identical, the shape of the air chamber 130A will be mainly described hereinafter. As shown in FIG. 2, the bottom surface 132 of the air chamber 130A is formed by repeating an arch shape forming a circular arc in the cross sectional view along the tire circumferential direction. In other words, the height H from the bottom surface 132 of the air chamber 130A up to the grounding surface (for example, the surface of the land portion 120A grounded to the road surface RS) changes along the tire circumferential direction. The center CT1 of the circular arc of the bottom surface 132 is positioned on the further inner side of the tire radial direction than the bottom surface 132.

The bottom surface 132 makes contact with the road surface RS at the highest position 132a where the height up to the grounding surface is highest. More specifically, the bottom surface 132 makes a line contact with the road surface RS along a direction different from the tire circumferential direction. In other words, the bottom surface 132 has a shape such that the width along the tire circumferential direction of the bottom surface 132 contact with the road surface RS becomes as narrow as possible.

The highest position 132a of the bottom surface 132 is along the tread width direction (direction D2) as viewed in a tread plane. In, other words, the outer end 132e1 in the tread width direction of the highest position 132a and the inner side end 132e2 in the tread width direction of the highest position 132a are almost identical with respect to the tread width direction (refer to FIG. 2 and FIG. 4 described later).

Although the shape of the bottom surface of the air chamber 130E is identical to the shape of the bottom surface 132, the highest position 132a of the bottom surface 132 of the air chamber 130A and the highest position 132a of the bottom surface of the air chamber 130B have a half phase shift of pitch P in the tire circumferential direction.

A constriction groove 121 and a narrow groove 122 are formed in the land portion 120A. The constriction groove 121 and the narrow groove 122 are narrow grooves whose groove widths are approximately several mm (millimeters). The constriction groove 121 communicates to the recessed portion 131. The volume of the space formed by the constriction groove 121 and road surface RS has a volume smaller than the space formed by the recessed portion 131 and the road surface. The constriction groove 121 and the narrow groove 122 are positioned at the further rear of the tire rotation direction (direction D2) from the outer end in the tread width direction than from the inner end in the tread width direction.

Figure 3:
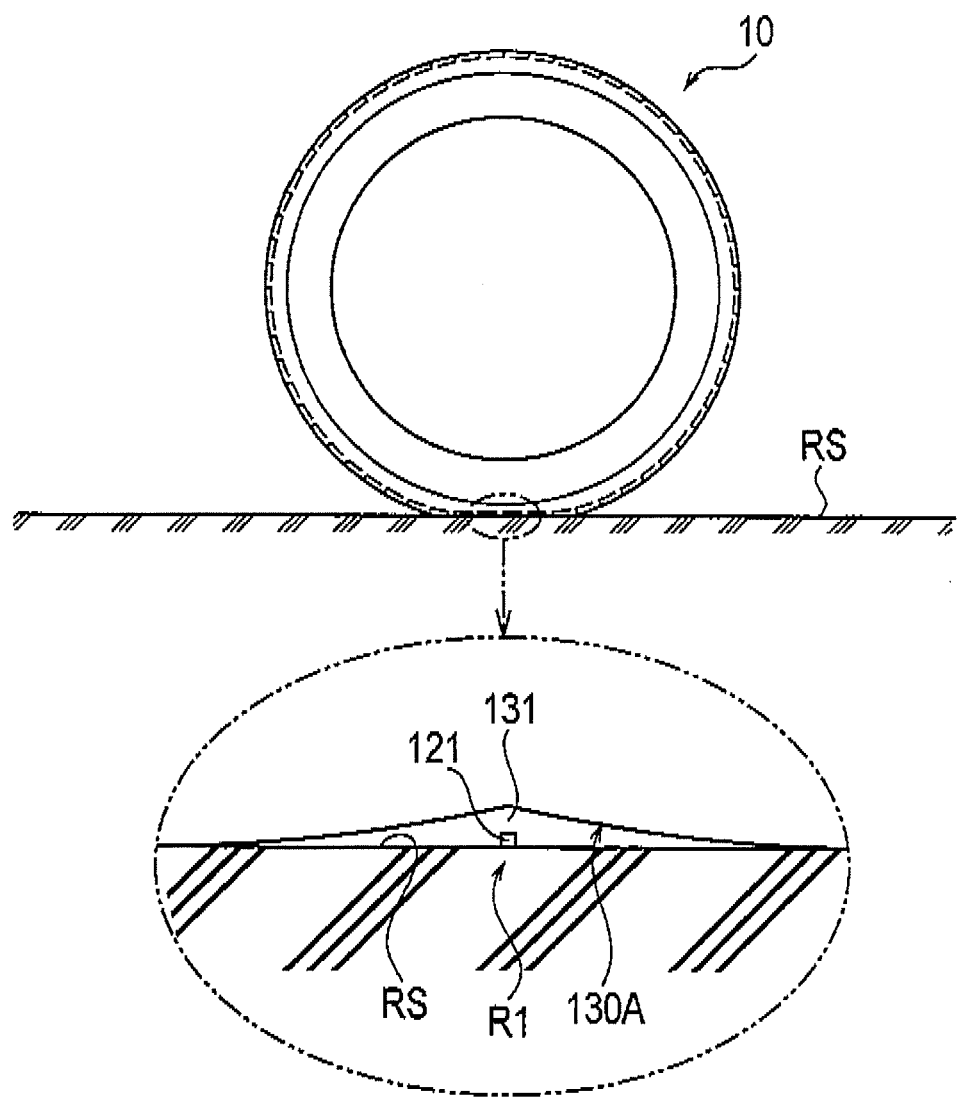
FIG. 3 shows the shape as viewed in the tread width direction of the Helmholtz type resonator R1 according to the first embodiment.
Figure 4:
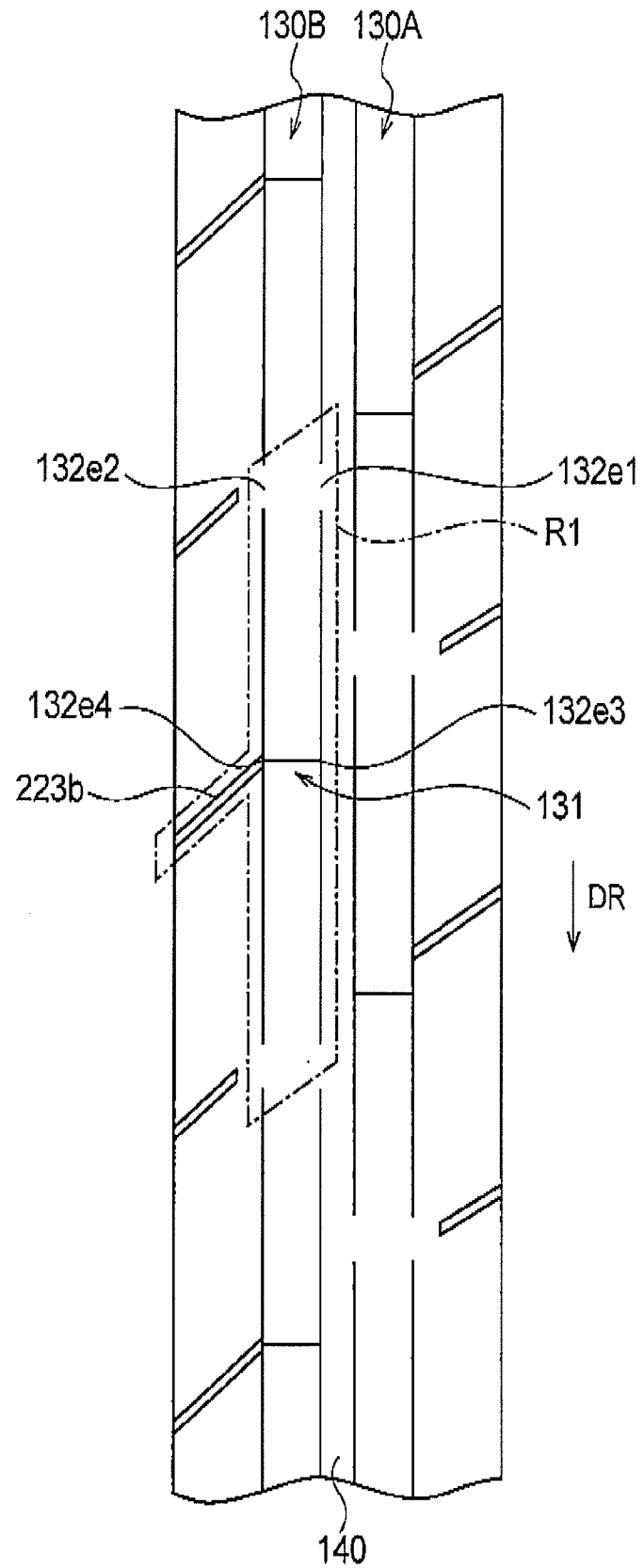
FIG. 4 shows the shape viewed in a tread plane of the Helmholtz type resonator R1 according to the first embodiment.

FIG. 3 and FIG. 4 show the shape of the Helmholtz type resonator R1 formed by the pneumatic tire 10 and road surface RS. More specifically, FIG. 3 shows the shape of the Helmholtz type resonator R1 as viewed in the tread width direction. FIG. 4 shows the shape of the Helmholtz type resonator R1 viewed in a tread plane. As shown in FIG. 3 and FIG. 4, the constriction groove 121 and the air chamber 130A that has the recessed portion 131 configure the Helmholtz type resonator R1.

As described above, although the height H from the bottom surface 132 of the air chamber 130A up to the grounding surface changes along the tire circumferential direction, a plurality of the highest positions 132a make contact with the road surface RS repeatedly at every pitch P. Because of this, an air chamber is formed communicated to the constriction groove 121. Namely, an air chamber is formed for the Helmholtz type resonator R1 by means of the bottom surface 132 between the two highest positions 132a being adjacent to each other and the road surface RS making contact with the land portion 120A and the land portion 140. Because a method to reduce air column resonance using the Helmholtz type resonator R1 is disclosed in the prior art documents mentioned in this specification, the description will be omitted here.

As shown in FIG. 2, one end (end portion 121a) of the constriction groove 121 communicates to a closed space formed by the air chamber 130A and the road surface RS. More specifically, the end portion 121a communicates to a closed space formed by the recessed portion 131, the highest positions 132a formed at both ends in the tire circumferential direction of the recessed portion 131, and the road surface RS.

On the other hand, the other end (end portion 121b) of the constriction groove 121 communicates to the circumferential groove 11. In this embodiment, the end portion 121a communicates to the recessed portion 131 at the lowest position 132b where the position of the bottom surface 132 is lowest. For this reason, the Helmholtz type resonator R1 opens at one end only and closes at the other end.

The lowest position 132b of the bottom surface 132 is along the tread width direction (direction D2) as viewed in a tread plane. In other words, the outer end 132e3 in the tread width direction of the lowest position 132b and the inner side end 132e4 in the tread width direction of the lowest position 132b are almost identical with respect to the tread width direction (refer to FIG. 2 and FIG. 4).

The narrow groove 122 communicates to only the circumferential groove 11. In other words, the narrow groove 122 does not communicate to the recessed portion 131. For this reason, the narrow groove 122 does not serve as a component of the Helmholtz type resonator R1.

(2.2) Rib-Shaped Land Portions 210 and 240

Figure 5:
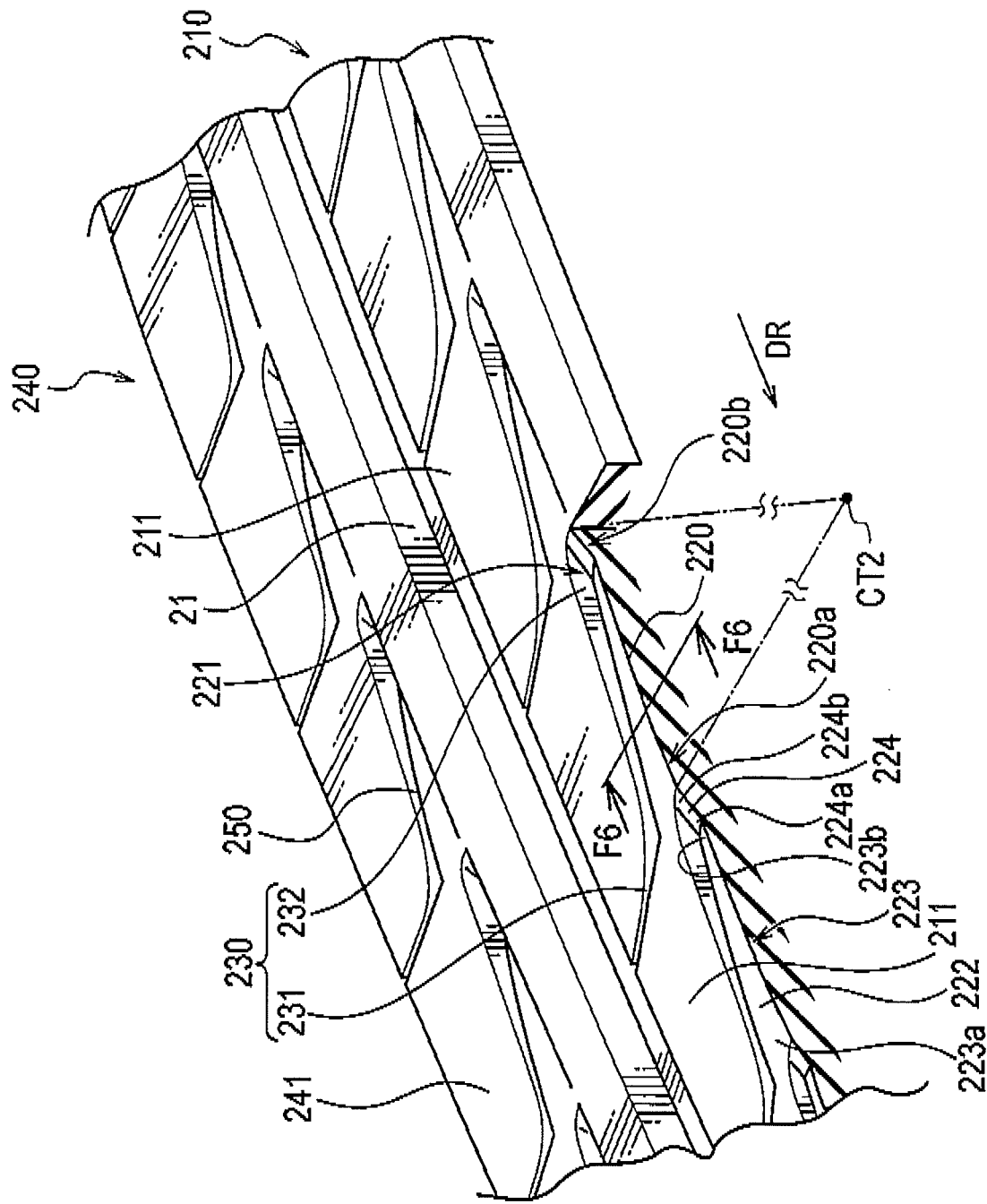
FIG. 5 is a partial perspective view of the rib-shaped land portion 210 and the rib-shaped land portion 240 with omitting a part of rib-shaped land portion 210 according to the first embodiment.

FIG. 5 is a partial perspective view of the rib-shaped land portion 210 and the rib-shaped land portion 240 with omitting a part of the rib-shaped land portion 210. As shown in FIG. 5, the rib-shaped land portion 210 is provided with the land portion 211 that is grounded to the road surface RS (refer to FIG. 7) and a plurality of air chambers 220. A plurality of air chambers 220 are provided along the tire circumferential direction. The rib-shaped land portion 240 is provided with a land portion 241 that has an identical shape of the land portion 211 and the air chamber 250 has an identical shape of the air chamber 220. The rib-shaped land portion 240 is provided at a different position from the rib-shaped land portion 210 in a tread width direction. In the first embodiment, the rib-shaped land portion 210 configures a first rib-shaped land portion, and the rib-shaped land portion 240 configures a second rib-shaped land portion.

Figure 6:
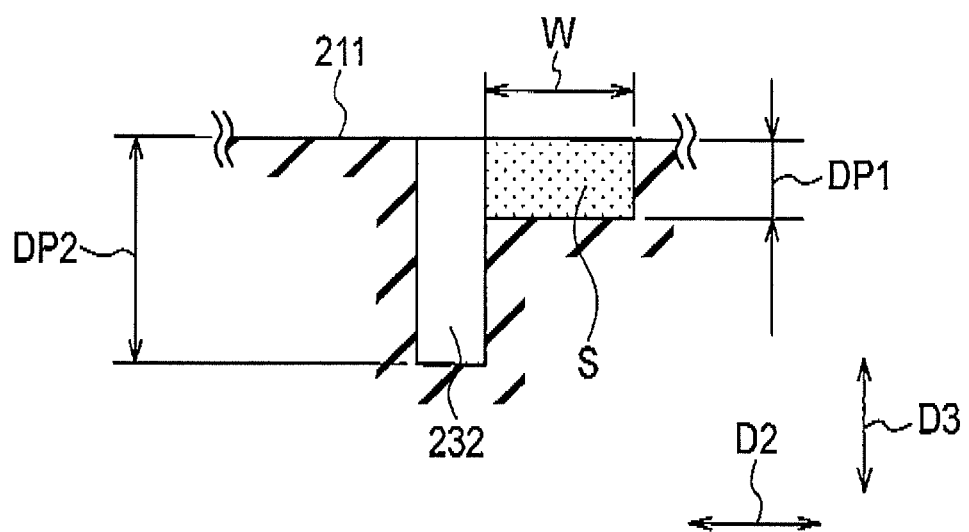
FIG. 6 is a cross-sectional view of the air chamber 220 along line F6-F6 shown in FIG. 5 according to the first embodiment.

Since the shapes of the air chambers 220 and the air chambers 250 are identical, in the following, a description of the shape of the air chamber 220 will be mainly described. FIG. 6 is the cross-sectional view of the air chamber 220 along line F6-F6 shown in FIG. 5. As shown in FIG. 5 and FIG. 6, the air chamber 220 has the recessed portion 221 recessed toward the inside in the tire radial direction.

The depth DP1 of the recessed portion 221 based on the grounding surface where the land portion 211 is grounded with the road surface (surface of the land portion 211 grounded with the road surface RS), is deeper at one end (the end portion 220b positioned at the rear of the tire rotation direction (direction DR) referred to FIG. 5) of the air chamber 220 in the tire circumferential direction than at the other end (the end portion 220a positioned at the front of the tire rotation direction referred to FIG. 5) of the air chamber 220. In addition, the height from the bottom surface 222 of the recessed portion 221 up to the grounding surface changes along with tire circumferential direction.

The bottom surface 222 of the recessed portion 221 has a curved portion 223 in a curved line shape in the cross-sectional view along the tire circumferential direction. The center CT2 of the circular arc along the curved portion 223 is positioned on the further inner side in the tire radial direction than the bottom surface 222. The curved portion 223 can also be configured by a plurality of circular arcs. For this case, the center CT2 is taken as the center of one circular arc approximated to the curve formed by the plurality of circular arcs.

The bottom surface 222 has a linear portion 224 that has a linear shape in the cross-sectional view along the tire circumferential direction. The linear portion 224 is formed on the end portion 220b (refer to FIG. 5) side of the air chamber 220. One end of the linear portion 224 (end portion 224a) connects to the end portion 223b of the curved portion 223 while the other end of the linear portion 224 (end portion 224b) connects to the grounding surface where the land portion 211 grounds with the road surface.

The constriction groove 230 communicates to the air chamber 220. More specifically, the constriction groove 230 communicates to the end portion 220a of the air chamber 220 in the tire circumferential direction. In other words, the constriction groove 230 communicates to a closed space formed by the air chamber 220 and the road surface RS. Moreover, the constriction groove 230 communicates to the circumferential groove 21. The volume of the space formed by the constriction groove 230 and a road surface is smaller than the volume of space formed by the recessed portion 221 and a road surface.

The constriction groove 230 is configured by an outer groove 231 and an inner groove 232. The outer groove 231 communicates to the circumferential groove 21, and extends to the end portion 220a of the air chamber 220. The inner groove 232 communicates to the outer groove 231 and extends to the end portion 220b of the air chamber 220 and more specifically extends up to the side of the linear portion 224 along the tire circumferential direction. In the first embodiment, the inner groove 232 configures an extension portion. The inner groove 232 is formed between the recessed portion 221 and the grounding surface where the land portion 211 is grounded with the road surface.

As shown in FIG. 6, the constriction groove 230, more specifically, the depth DP2 of the inner groove 232 is deeper than the depth DP1 of the recessed portion 221 from the grounding surface where the land portion 211 is grounded with the road surface.

Figure 7:
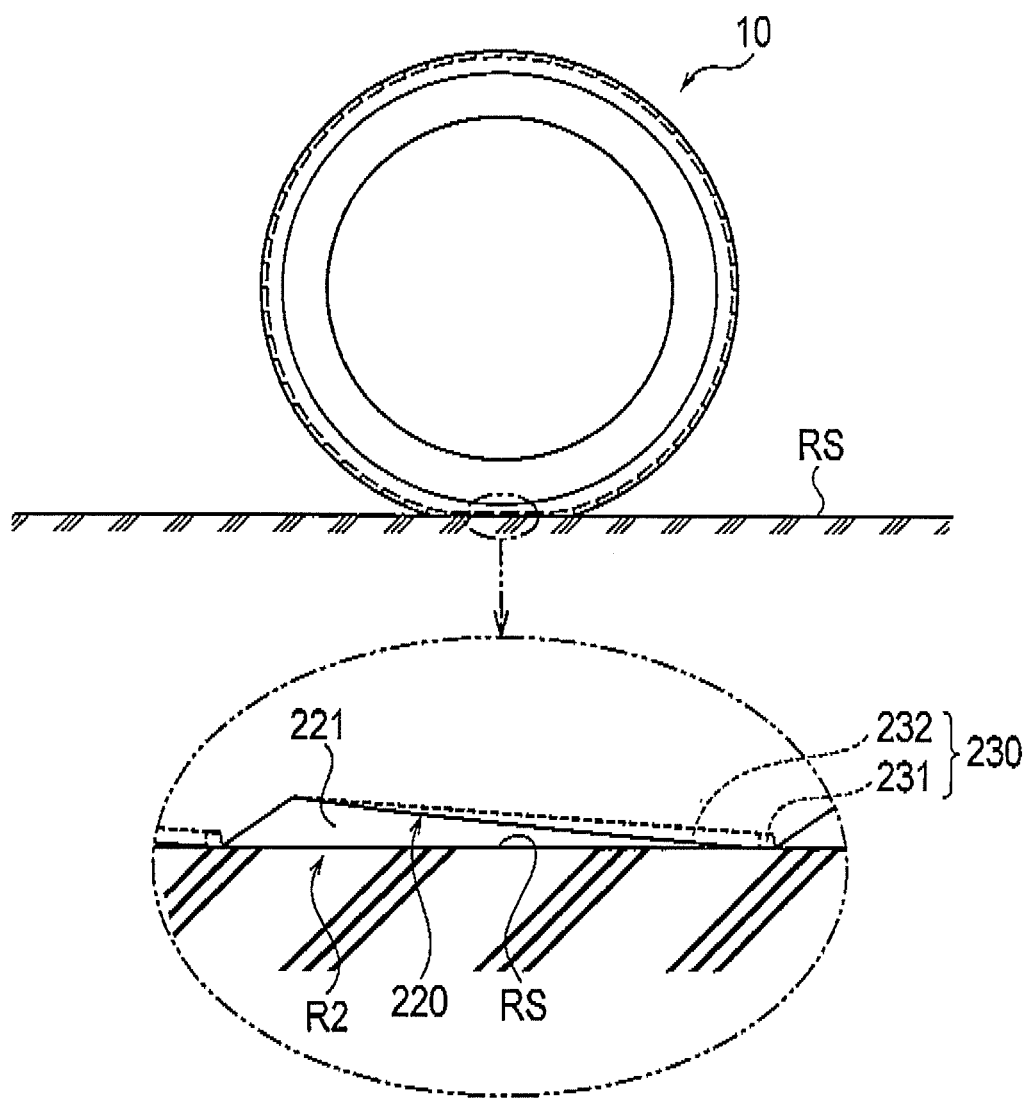
FIG. 7 shows the shape as viewed in the tread width direction of the Helmholtz type resonator R2 according to the first embodiment.

FIG. 7 shows the shape of the Helmholtz type resonator R2 formed by the pneumatic tire 10 and the road surface RS. More specifically, FIG. 7 shows the shape of the Helmholtz type resonator R2 as viewed in the tread width direction. The region enclosed by the alternating long and short dashed lines of FIG. 8 shows the shape of the Helmholtz type resonator R2 as viewed in a tread plane.

As shown in FIG. 7, the constriction groove 230 configured by the air chamber 220 that has the recessed portion 221, the outer groove 231, and the inner groove 232 configures the Helmholtz type resonator R2. In like manner to the Helmholtz type resonator R1, the Helmholtz type resonator R2 opens only at one end and closes at the other end.

Figure 8:
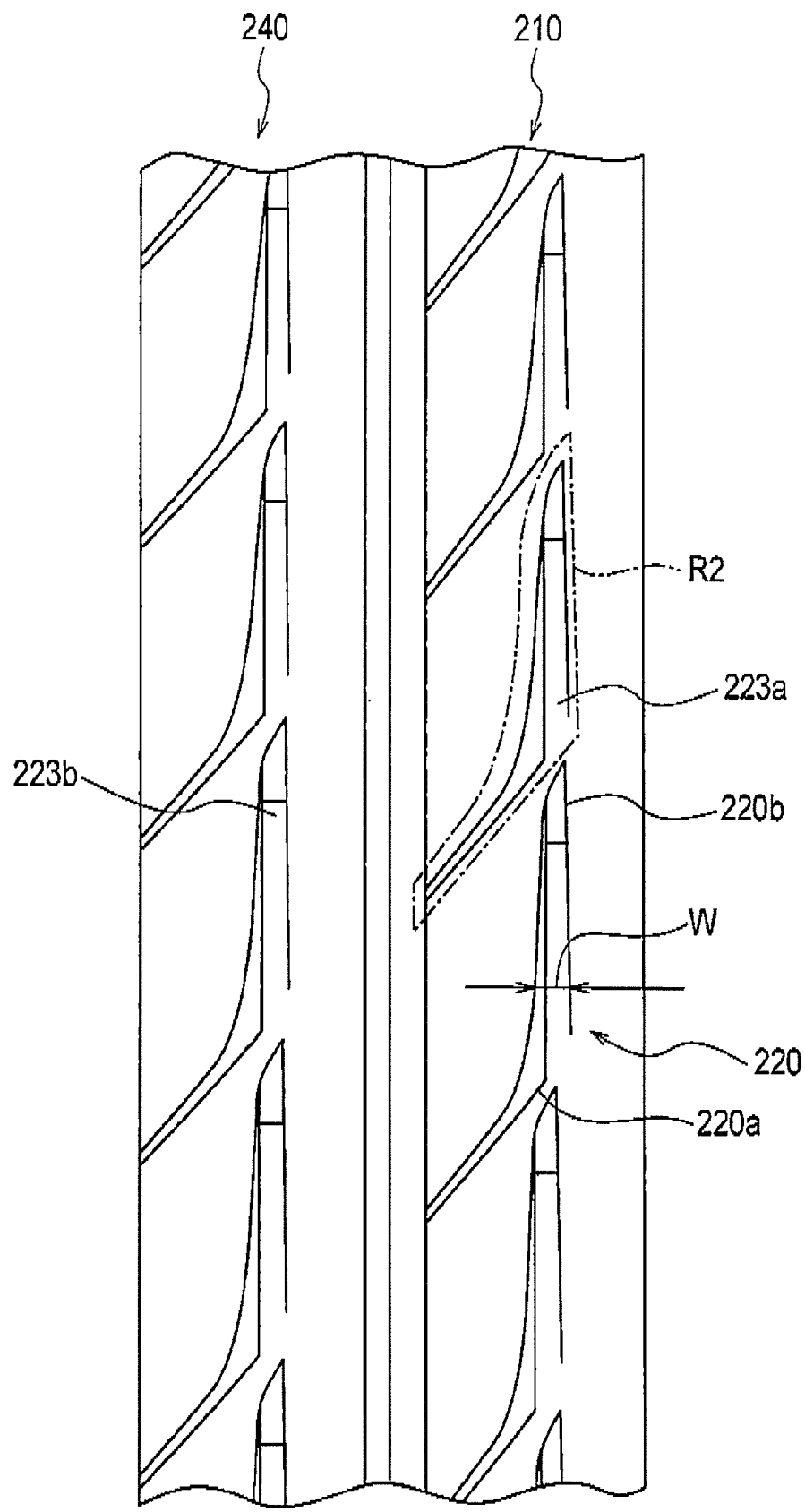
FIG. 8 is a partial enlarged plan view of the rib-shaped land portion 210 and the rib-shaped land portion 240 according to the first embodiment.

FIG. 8 is a partial enlarged plan view of the rib-shaped land portion 210 and the rib-shaped land portion 240. As shown in FIG. 8, the air chamber 220 has a tapered shape in which the width W in the tread width direction becomes narrower in proportion to movement from the end portion 220a of the air chamber 220 toward the end portion 220b as viewed in a tread plane.

The cross-sectional area S (refer to FIG. 6) along the tread width direction (direction D2) of the recessed portion 221 and the tire radial direction (direction D3 in the figure) is almost the same from one end (end portion 223a) in the tire circumferential direction of the curved portion 223 to the other end (end portion 223b).

In the first embodiment, as shown in FIG. 8, the position in the tire circumferential direction of the air chamber 220 formed on the rib-shaped land portion 210 differs from the position of the air chamber 250 formed on the rib-shaped land portion 240. More specifically, the position (end portion 223b) with a deepest depth from the grounding surface (land portion 241) of the recessed portion formed on the rib-shaped land portion 240 is almost the same as the position with the shallowest depth (end portion 223a) from the grounding surface (land portion 211) of the recessed portion 221 formed on the rib-shaped land portion 210 in the tire circumferential direction.

(3) Operation and Effect

According to the pneumatic tare 10, the height H from the bottom surface 132 of the air chamber 130A (130B) up to grounding surface where the land portion 120A (120B) grounds with the road surface RS changes along the tire circumferential direction. In other words, since the depth from grounding surface of the air chamber 130A changes along the tire circumferential direction, wedged small stones will be moved in the tire circumferential direction along with the rolling motion of the pneumatic tire 10 even if a small stone becomes wedged by the air chamber 130A, making them easier to separate from the air chamber 130A. As a result, the occurrence of the so-called "wedged stone" can be controlled.

By means of the constriction groove 121 and the air chamber 130A, more specifically, since the Helmholtz type resonators R1 and R2 are configured to correspond to the frequency band of which sound will be absorbed, by the constriction groove 121 and an air chamber which is formed by contacting a plurality of the highest positions 132a with the road surface RS repeatedly at every pitch P, it possible to effectively reduce the air column resonance caused by the circumferential groove 11.

In the first embodiment, the bottom surface 132 of the air chamber 130A makes a line contact with the road surface RS along a direction different from the tire circumferential direction. For this reason, the space of the air chamber 130A is easily enlarged thereby making it possible to easily configure a Helmholtz type resonator corresponding to the frequency band to be absorbed.

In the first embodiment, the end portion 121a of the constriction groove 121 communicates to the recessed portion 131 at the lowest position 132b of the bottom surface 132. For this reason, even after the pneumatic tire 10 wears out a fixed amount, the function of a Helmholtz type resonator can be maintained.

In the first embodiment, the bottom surface 132 of the air chamber 130A is formed by repeating an arch shape. The center of the circular arc that forms an arch shape is positioned on the inner side in the tire radial direction than the bottom surface 132. For this reason, the function of the Helmholtz type resonator can be ensured while more effectively controlling wedged stone.

In the first embodiment, the highest position 132a of the bottom surface 132 of the air chamber 130A and the highest position 132a of the bottom surface of the air chamber 130B have a half phase shift of the pitch P in the tire circumferential direction. For this reason, the rigidity of the tread portions of the pneumatic tire 10 grounded to the road surface RS is almost uniform in the tire circumferential direction.

According to the pneumatic tire 10, the depth DP1 of the recessed portion 221 of the air chamber 220 is deeper at the end portion 220b of the air chamber 220 than at the end portion 220a of the air chamber 220. In addition, the bottom surface 222 of the recessed portion 221 has the curved portion 223. In other words, since small stones wedged in the air chamber 220 are supported in general at three points of the curved portion 223 and both side surfaces (land portion 211) of the recessed portion 221, it is easy to separate small stones from the air chamber 220 compared to when the bottom surface 222 is a flat surface. As a result, the occurrence of the "wedged stone" can be controlled.

Even further, since the Helmholtz type resonator corresponding to the frequency band whose sound will be absorbed is configured by the constriction groove 230 and the air chamber 220, air column resonance caused by the circumferential groove 21 can be effectively reduced.

In the first embodiment, the bottom surface 222 of the recessed portion 221 has the linear portion 224 communicated to the curved portion 223 and the grounding surface. For this reason, if the rolling motion of the pneumatic tire 10 causes to move a small stone to be wedged, the small stone easily separates from the air chamber 220 through the linear shape portion 224 communicated to the curved portion 223.

The constriction groove 230 is communicated to the end portion 220a of the air chamber 220. The constriction groove 230 is also deeper than depth DP1 of the recessed portion 221 and has an inner groove 232 that extends to the end portion 220b of the air chamber 220. The inner groove 232 is formed between the recessed portion 221 and the land portion 211 (grounding surface). For this reason, even after the pneumatic tire 10 wears out a fixed amount, the function of a Helmholtz type resonator can be maintained.

In the first embodiment, the cross-section area S is almost the same from the end portion 223a of the curved portion 223 to the end portion 223b. The deepest position (end portion 223b) from the grounding surface formed on the rib-shaped land portion 240 is almost the same as the shallowest position (end portion 223a) from the grounding surface of the recessed portion 221 formed on the rib-shaped land portion 210 in the tire circumferential direction. For this reason, the rigidity of the tread portion of the pneumatic tire 10 grounded to the road surface is almost uniform in the tire circumferential direction.

Second Embodiment

In the following, a pneumatic tire 10A according to a second embodiment will be described referring to the drawings. Portions with symbols identical to the pneumatic tire 10 of the first embodiment will be given identical symbols and the differences mainly described.

Figure 9:
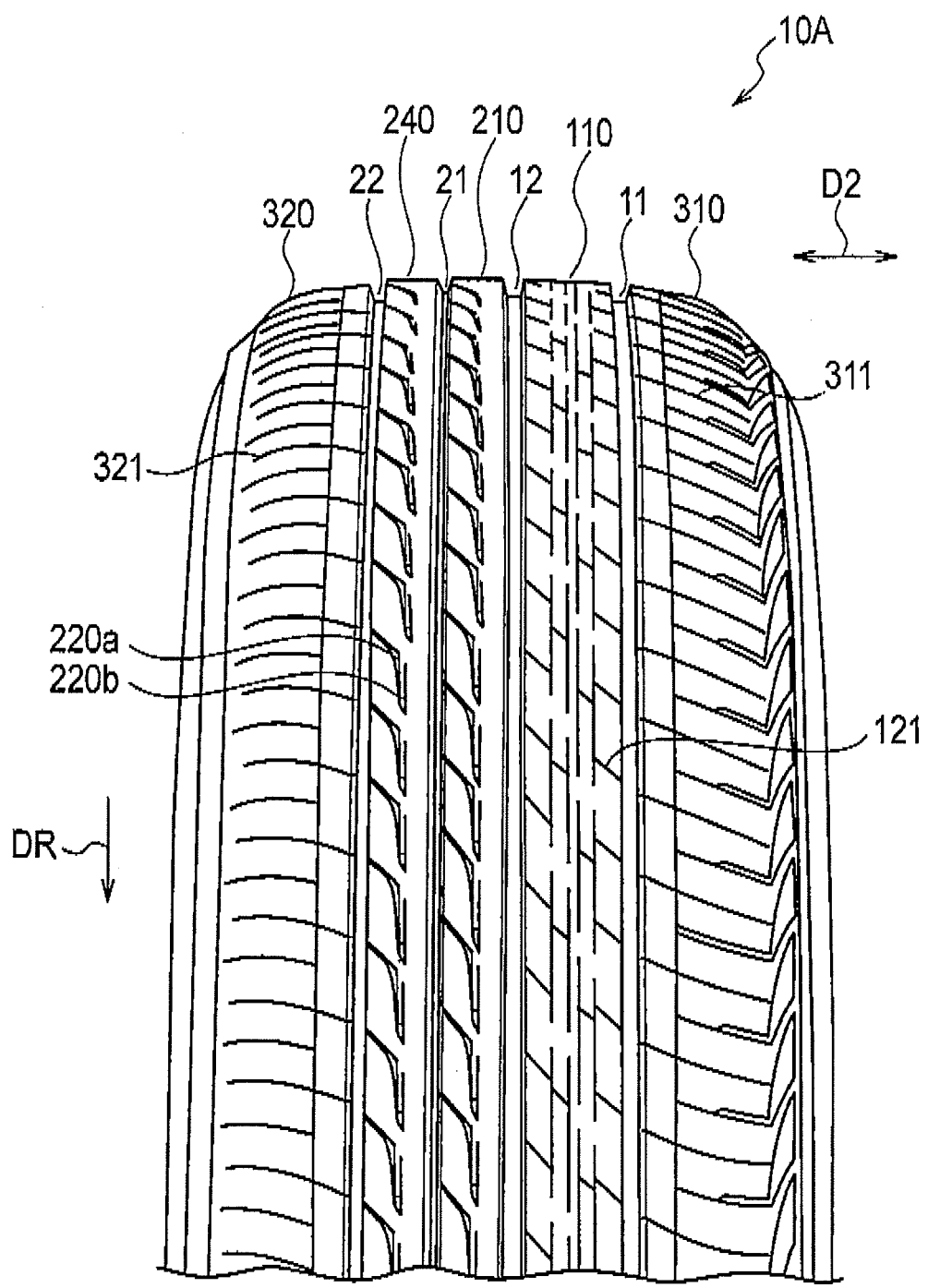
FIG. 9 is a partial front view of the pneumatic tire 10A according to the second embodiment.

FIG. 9 is a partial front view of the pneumatic tire 10A according to the second embodiment. In like manner to the second embodiment, the rotation direction of the pneumatic tire 10A according to the second embodiment is direction DR of FIG. 9.

According to the first embodiment described above, the end portion 220a of the air chamber 220 is positioned at the further front of the tire rotation direction (direction DR) rather away from the end portion 220b of the air chamber 220. For the constriction groove 121 (narrow groove 122), the outer end in the tread width direction is positioned at the further rear of the tire rotation direction rather away from the inner end in the tread width direction.

The tread width direction outer end of the inclined narrow groove 311 is positioned further rearward of the tire rotation direction than the tread width direction inner end. Moreover, the tread width direction outer end of the inclined narrow groove 321 is positioned further forward of the tire rotation direction than the tread width direction inner end. Thus, the pneumatic tire 10 according to the first embodiment includes a right rising pattern (see FIG. 1).

On the other hand, in the second embodiment, as shown in FIG. 9, the end portion 220a of the air chamber 220 is positioned further rearward of the tire rotation direction (direction DR) than the end portion 220b of the air chamber 220. That is, the outer groove 231 extends to the end portion 220a positioned rearward of the tire rotation direction of the air chamber 220.

In the constriction groove 121, tread width direction outer end is positioned further forward of the tire rotate direction than the tread width direction inner end. The tread width direction outer end of the inclined narrow groove 311 is positioned further forward of the tire rotation direction than the tread width direction inner end. Moreover, the tread width direction outer end of the inclined narrow groove 321 is positioned further rearward of the tire rotation direction than the tread width direction inner end.

Thus, the pneumatic tire 10A according to the second embodiment includes a left rising pattern. In this case, taking into consideration the balance of the pneumatic tire 10A, the cord configuring a belt layer (not shown) preferably is inclined to the opposite side of the tread pattern viewed in a tread plane (that is, a right rising cord).

MODIFICATION

Hereinafter, an air chamber according to a modification of the present invention is described with reference to the drawings. Specifically, (1) First modification, (2) Second modification, (3) Third modification, (4) Fourth modification, (5) Fifth modification, and (6) Sixth modification are described. It is noted that the same numerals are assigned to the same parts as those in the pneumatic tire 10 according to the first embodiment or the pneumatic tire 10A according to the second embodiment and the difference parts are focused on.

(1) First Modification

Figure 10:
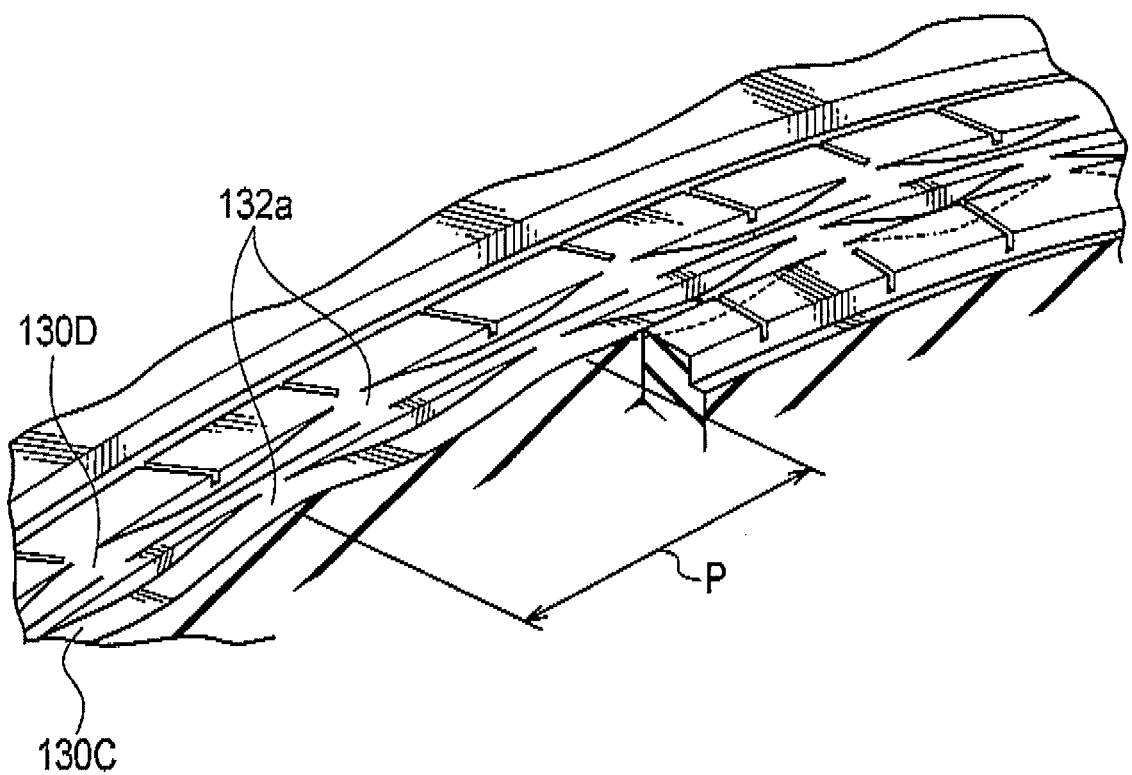
FIG. 10 shows the air chamber according to a first modification of the present invention.

FIG. 10 corresponds to FIG. 2 of the above-described first embodiment. Specifically, FIG. 10 shows an air chamber according to a first modification of the present invention.

As shown in FIG. 10, the bottom surface of air chambers 130O and 13W) is in a sine wave shape in a cross-sectional view along the tire circumferential direction. Similar to the above-described air chamber 130A and air chamber 130B, a highest position 132a of the bottom surface of the air chamber 130C and a highest position 132a of the bottom surface of the air chamber 130B are shifted by approximately half the pitch P in the tire circumferential direction.

When the shape of the bottom surface is in a sine wave shape in this way, a groove volume (negative ratio) of a tread portion of the pneumatic tire 10 making contact with the road surface is more uniform in the tire circumferential direction.

(2) Second Modification

Figure 11:
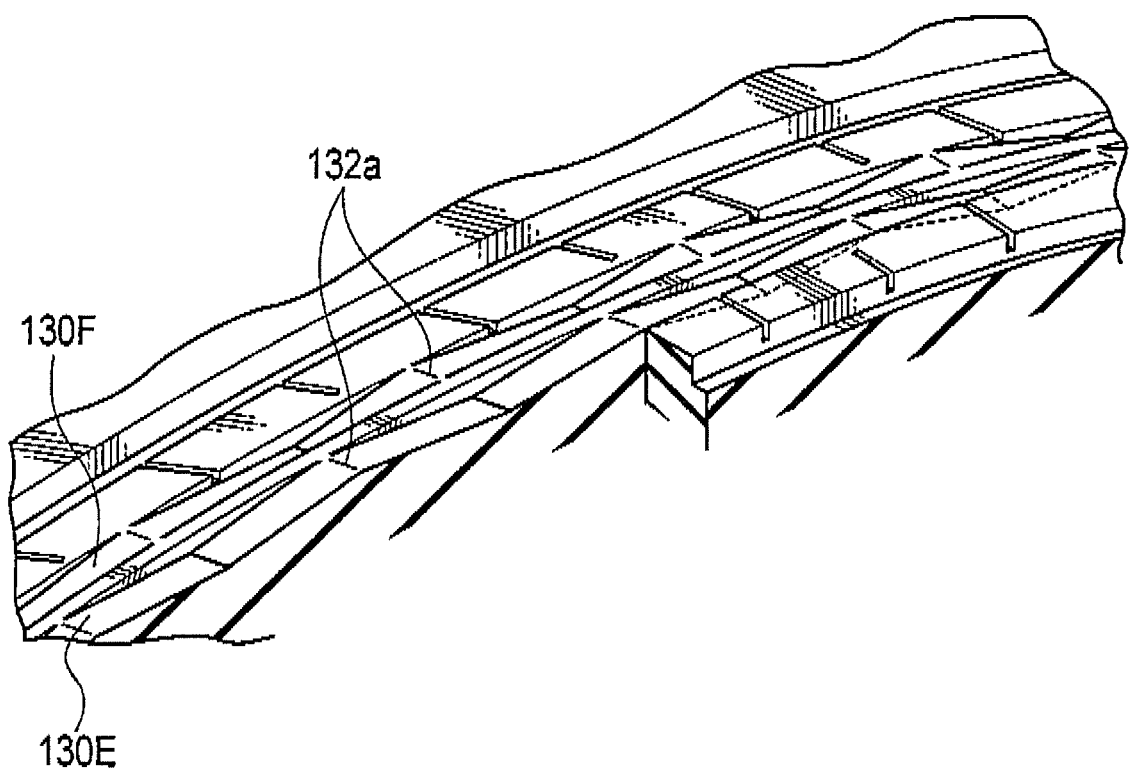
FIG. 11 shows the air chamber according to a second modification of the present invention.

FIG. 11 shows an air chamber according to a second modification of the present invention. As shown in FIG. 11, the bottom surface of air chambers 130E and 130F is in a mountain shape (triangular shape) in a cross-sectional view along the tire circumferential direction. It is noted that the relationship in terms of arrangement of the highest position 132a is the same as that in the above-described first embodiment.

(3) Third Modification

Figure 12:
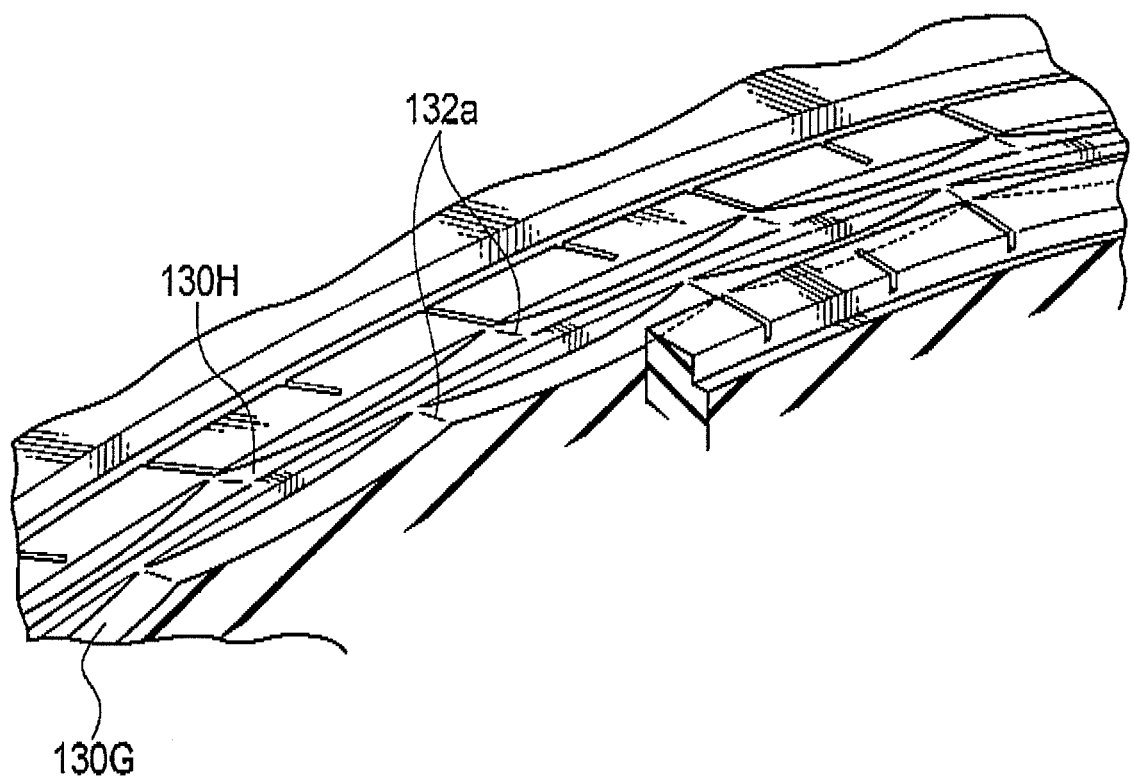
FIG. 12 shows the air chamber according to a third modification of the present invention.

FIG. 12 shows an air chamber according to a third modification of the present invention. As shown in FIG. 12, the bottom surface of air chambers 130G and 130H is the same as that of the air chamber 130A and the air chamber 130B in that the bottom surface thereof are in an arch shape forming a circular arc in a cross-sectional view along the tire circumferential direction.

It is noted, however, in the air chambers 130G and 130H, the center of the circular arc forming the bottom surface of the air chamber is not positioned at an inner side of the tire radial direction than the bottom surface but positioned at an outer side of the tire radial direction. That is, the bottom surface of the air chambers 130G and 130H is in an inverted arch shape, as compared to the air chamber 130A and the air chamber 130B. It is noted that the relationship in terms of arrangement of the highest position 132a is the same as that in the above-described first embodiment.

(4) Fourth Modification

Figure 13:
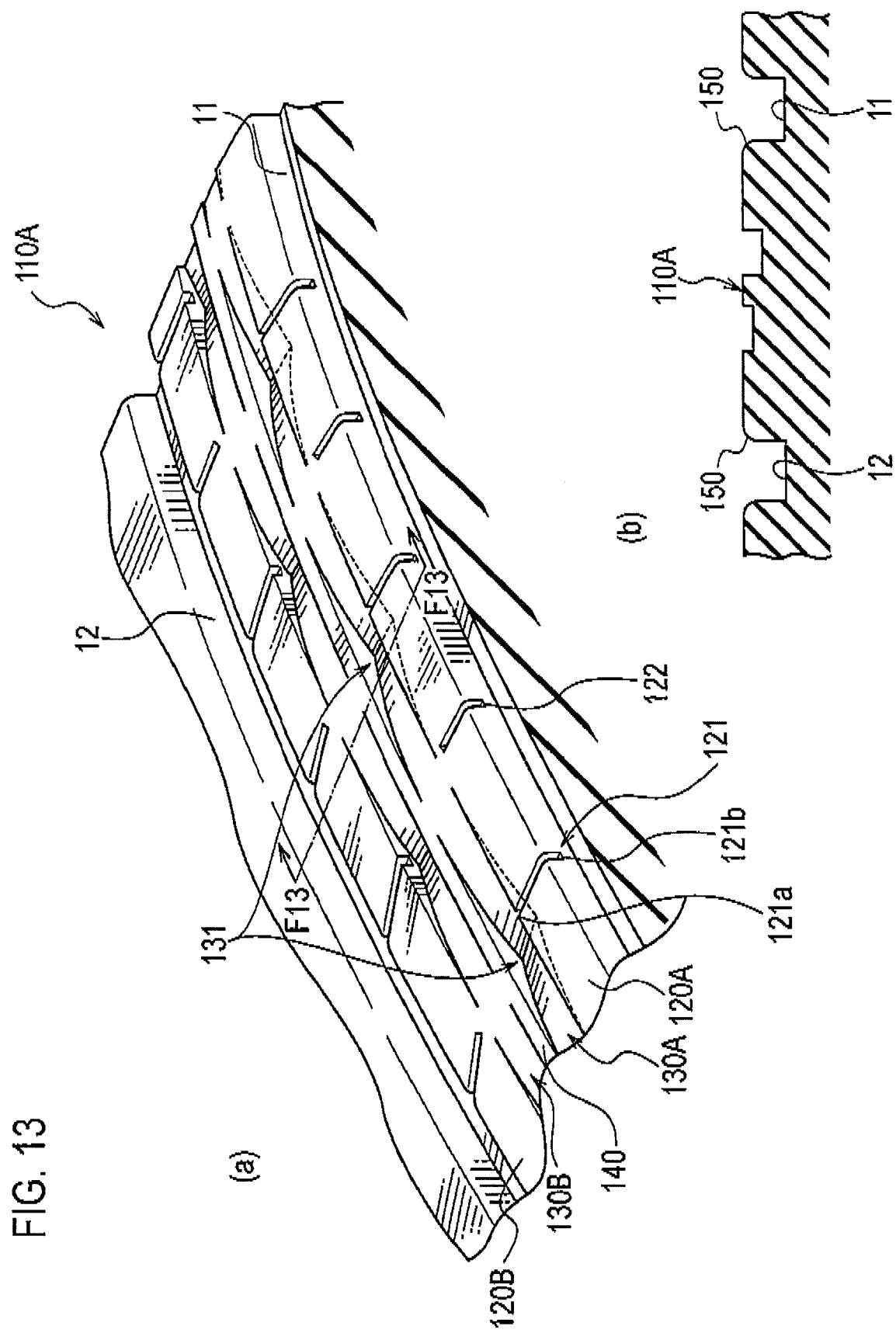
FIG. 13 shows a part of a rib-shaped land portion 110A according to a fourth modification of the present invention.

FIG. 13(a) shows one portion of a rib-shaped land portion 110A according to a fourth modification of the present invention. FIG. 13(b) shows the cross section (cross section along line F13 to F13 of FIG. 13(a)) of the rib-shaped land portion 110A according to the fourth modification of the present invention.

As shown in FIG. 13(a) and FIG. 13(b), in an edge portion along the tire circumferential direction (direction D1) of the rib-shaped land portion 110A, a chamfered portion 150 is formed. Specifically, the chamfered portion 150 is configured in a curved line (R shape) in the cross section (see FIG. 13(b)) along the tread width direction and the tire radial direction.

It is noted that the chamfered portion 150 may not need to be configured in a curved line in the cross section along the tread width direction and the tire radial direction, and may be an inclined surface (so-called tapered shape).

Further, the chamfered portion 150 need not be configured over the entire edge portion along the tire circumferential direction (direction D1) of the rib-shaped land portion 110A, and preferably is formed in a portion communicating to at least a constriction groove 121, of the edge portion along the tire circumferential direction of the rib-shaped land portion 110A.

The chamfered portion 150 does not necessarily need to be formed only on the rib-shaped land portion 110A, and may be formed in the edge portion along the respective tire circumferential directions of the land portion 120A, the land portion 120B, and the land portion 140 configuring the rib-shaped land portion 110A. The chamfered portion 150 may be formed in the edge portion along the respective tire circumferential direction of the rib-shaped land portions 210 and 240 (see FIG. 1).

As a result of the chamfered portion 150 being formed (in particular, the chamfered portion 150 being configured in a curved line (R shape)), it is possible to inhibit the reduction of the volume (size) of the constriction groove 121 at the time of a wear and it is possible to maintain the function of the Helmholtz type resonator longer. Thus, it is possible to achieve both objects, i.e., to inhibit wedging stone and to maintain the function of the Helmholtz type resonator.

(5) Fifth Modification

Figure 14:
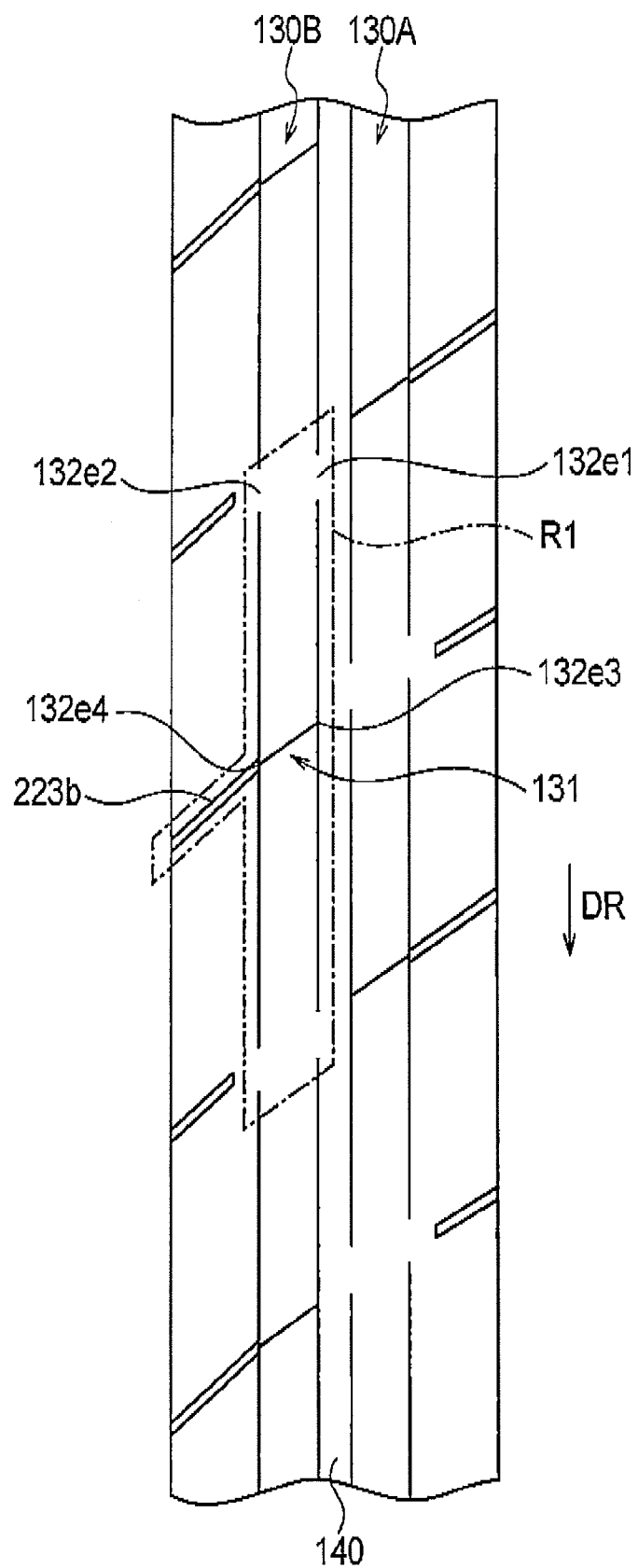
FIG. 14 shows the shape as viewed in a tread plane of the air chamber 130A and the air chamber 130B according to a fifth modification of the present invention.

FIG. 14 shows the vicinity of the air chamber 130A and the air chamber 130B viewed in a tread plane. As shown in FIG. 14, a highest position 132a of the bottom surface 132 in the air chamber 130A and the air chamber 130B is inclined in the tread width direction so as to be in the approximately same direction of the narrow groove 122, viewed in a tread plane.

That is, an outer end 132e1 in the tread width direction of the highest position 132a and an inner end 132e2 in the tread width direction of the highest position 132a are shifted relative to the tire radial direction.

Similarly, a lowest position 132b of the bottom surface 132 is inclined in the tread width direction so as to be in the approximately same direction as the constriction groove 121, viewed in a tread plane. That is, the outer end 132e3 in the tread width direction of the lowest position 132b and the inner end 132e4 in the tread width direction of the lowest position 132b are shifted relative to the tread width direction.

In the case of such highest position 132a and lowest position 132b, it is possible to prevent a situation where the air chamber 130A and the air chamber 130B (for example, the highest position 132a) make contact with the road surface RS in a concentrated manner, when the pneumatic tire 10 is brand new or even after the pneumatic tire 10 is worn out by a constant amount. Thus, it is possible to effectively reduce the pattern noise caused due to the impact between the pneumatic tire 10 and the road surface RS.

(6) Sixth Modification

FIG. 15(a) shows a partial perspective view of a rib-shaped land portion 110B according to the fifth modification of the present invention. FIG. 15(b) shows the cross section (cross section along line F15 to F15 of FIG. 15(a)) of the rib-shaped land portion 110B according to the fifth modification of the present invention.

As shown in FIG. 15(a) and FIG. 15(b), between land portions 120A and 140 configuring the rib-shaped land portion 110B, and the air chamber 130A, there is formed a circumferential direction sipe 30. The circumferential direction sipe 30 extends along the tire circumferential direction (direction D1) and the both ends in the tire circumferential direction communicate to the recessed portion 131. Similarly, between the land portions 120B and 140 configuring the rib-shaped land portion 110A, and the air chamber 130A, there is formed a circumferential diction sipe 30.

The both ends of the circumferential direction sipe 30 do not necessarily need to communicate to the recessed portion 131, and at least one of the both ends may communicate to the recessed portion 131.

When such a circumferential direction sipe 30 is formed, the compression stiffness of the land portions 120A, 120B, and 140, and the air chambers 130A and 130B is lowered after the pneumatic tire 10 is worn out by a constant amount, as compared to a case where the circumferential direction sipe 30 is not formed. Thus, it is difficult to transfer the vibration caused by the roughness on the road surface RS to the pneumatic tire 10, and the pattern noise can be effectively reduced.

Other Embodiments

So far, the present invention is disclosed through the above embodiments. However, it should not be interpreted that the statements and drawings constituting a part of the present disclosure limit the present invention. Further, various substitutions and embodiments shall be apparent to a person skilled in the art based on this disclosure. For example, the embodiment of the present invention can be modified as follows.

Other than these types of modified examples described above, the bottom surface shape of an air chamber can have a shape such as a staggered shape, a stair-like shape, and a combination of straight lines and circular arcs.

In the above-described first embodiment and second embodiment, the position in the tire circumferential direction of the air chamber 130A and the air chamber 130B and the positional relationship in the tire circumferential direction of the air chamber 220 and the air chamber 250, do not agree to have a uniform rigidity of the tread portion of the pneumatic tire 10 in a tire circumferential direction. Therefore, it is not always necessary to have such a positional relationship.

In the first embodiment and the second embodiment, the constriction groove 230 communicates to the end portion 220a of the air chamber 220 and includes the inner groove 232 extending to the end portion 220b; however, the constriction grove 230 do not necessarily need to be shaped in this way. For example, the constriction groove 230 may communicate to the center portion of the air chamber 220. Similarly, the end portion 121a of the constriction groove 121 does not necessarily need to communicate to the recessed portion 131 at the lowest position 132b of the bottom surface 132.

In the first embodiment and the second embodiment, the narrow groove 122 is formed in the land portion 120A; however, the narrow groove 122 may not need to be formed. Further, in the above-described embodiments, the air chamber 130A and the air chamber 130B are arranged on the same rib-shaped land portion; however, the both air chambers may be arranged on individual rib-shaped land portions.

In the first embodiment and the second embodiment described above, although the circumferential grooves 11, 12, 21, and 22 are extended in a linear shape along the tire circumferential direction, as long as the circumferential grooves extend along the tire circumferential direction, there is no limitation on a linear shape and a staggered shape or a corrugated shape can also be used.

Thus, it is needless to say that various embodiments which not been disclosed here are also included in the present invention. Therefore, the technical scope of the present invention is only stipulated by the invention characteristics related to the appropriate claims from above-mentioned description.

It is noted that the entire contents of Japanese Patent Application No. 2009-124612 (filed on May 22, 2009) and Japanese Patent Application No. 2009-271999 (filed on Nov. 30, 2009) are hereby incorporated in the present specification by reference.

INDUSTRIAL APPLICABILITY

Thus, the present invention can prevent a stone from being wedged in an air column resonator formed on a rib-shaped land portion of a tire in order to reduce noise, and therefore, the present invention can be applied to a tire requiring a noise reduction.

REFERENCE NUMERAL

10 . . . pneumatic tire, 11,12,21,22 . . . circumferential grooves, 110 . . . rib-shaped land portion, 120A, 120B . . . land portion, 121 . . . constriction groove, 121a,121b . . . end portion, 122 . . . narrow groove, 130A-130H . . . air chambers, 131 . . . recessed portion, 132 . . . bottom surface, 132a . . . highest portion, 132 . . . lowest portion, 140 . . . land portion, 210 . . . rib-shaped land portion, 211 . . . land portion, 220 . . . air chamber, 240 . . . rib-shaped land portion, 220a, 220b . . . end portions, 221 . . . recessed portion, 222 . . . bottom surface, 223 . . . curved portion, 224 . . . linear portion, 223a,223b,224a,224 . . . end portions, 230 . . . constriction groove, 231 . . . outer groove, 232 . . . inner groove, 241 . . . land portion, 250 . . . air chamber, CT1,CT2 ... centers, DP1,DP2 ... depths, H ... height, P ... pitch, R1,R2 .... Helmholtz type resonators, RS ... road surface, S ... cross sectional area, W ... width

The invention claimed is:

1. A tire comprising a rib-shaped land portion extending along a tire circumferential direction, which is adjacent to a circumferential groove extending along the tire circumferential direction wherein an air chamber in which a recessed portion recessed toward an inside in the tire radial direction repeats at predetermined pitches along the tire circumferential direction and a constriction groove communicating to the recessed portion are formed on the rib-shaped land portion, assuming a highest position being a grounding surface at which the rib-shaped land portion makes contact with a road surface, a bottom surface of the air chamber gradually changes, along the tire circumferential direction, from a portion where a depth from the grounding surface is deepest to the highest position, a volume of a space formed by the constriction groove and the road surface is smaller than a volume of a space formed by the recessed portion and the road surface, one end of the constriction groove communicates to a closed space formed by the air chamber and the road surface, and the other end of the constriction groove communicates to the circumferential groove, the bottom surface provided between two highest positions adjacent each other and the grounding surface contacting with the rib-shape land portion form the air chamber, wherein the bottom surface of the air chamber repeats an arch shape in a cross sectional view along the tire circumferential direction;

wherein the center of the arch shape is positioned at a further inner inside of a tire radial direction than the bottom surface.

2. The tire according to claim 1, wherein the bottom surface of the air chamber contacts the road surface at a highest position where a height to the grounding surface is highest.

3. The tire according to claim 2, wherein the bottom surface of the air chamber makes a line contacting the road surface along a direction different from the tire circumferential direction.

4. The tire according to claim 1, wherein one end of the constriction groove communicates to the recessed portion at a lowest position where the position of the bottom surface is lowest.

5. The tire according to claim 1, wherein the bottom surface of the air chamber is in a sine wave shape in a cross sectional view along the tire circumferential direction.

6. The tire according to claim 1, wherein the air chamber comprises:

a first air chamber; and a second air chamber arranged at a position different from a position at which the first air chamber is arranged in a tread width direction, a shape of the bottom surface of the second air chamber is approximately the same as a shape of the bottom surface of the first air chamber, in the first air chamber and the second air chamber, the recessed portion repeats at the predetermined pitches, and the highest position of the bottom surface of the first air chamber and the highest position of the bottom surface of the second air chamber are shifted in phase by half the predetermined pitches, in the tire circumferential direction.

7. The tire according to claim 6, wherein the first air chamber and the second air chamber are arranged in the same rib-shaped land portion.

8. The tire according to claim 1, wherein a chamfered portion is formed in a portion communicating to at least the constriction groove, of an edge portion along the tire circumferential direction of the rib-shaped land portion and the chamfered portion is configured by a curved line in a cross section along the tread width direction and the tire radial direction.

9. The tire according to claim 1, wherein the highest position at which the position of the bottom surface of the air chamber is highest is inclined in the tread width direction, viewed in a tread plane.

10. The tire according to claim 1, wherein the lowest position at which the position of the bottom surface of the air chamber is lowest is inclined in the tread width direction, viewed in a tread plane.

11. The tire according to claim 1, wherein a circumferential direction sipe which extends along the tire circumferential direction and of which at least one end communicates to the recessed portion is provided between the rib-shaped land portion and a tread element defining the bottom surface of the air chamber.

* * * * *